(12) United States Patent
Higham et al.

(10) Patent No.: US 7,190,890 B2
(45) Date of Patent: Mar. 13, 2007

(54) FLUID HEATER

(75) Inventors: Anthony J Higham, Auckland (NZ); Peter Brude Clark, Warkworth (NZ); Brendon Tait, Auckland (NZ)

(73) Assignee: Green Weeder Holdings Ltd., Auckland (NZ)

( * ) Notice: Subject to any disclaimer, the term of this patent is extended or adjusted under 35 U.S.C. 154(b) by 0 days.

(21) Appl. No.: 10/549,522

(22) PCT Filed: Mar. 18, 2004

(86) PCT No.: PCT/NZ2004/000055

§ 371 (c)(1), (2), (4) Date: Sep. 19, 2005

(87) PCT Pub. No.: WO2004/082377

PCT Pub. Date: Sep. 30, 2004

(65) Prior Publication Data

US 2006/0188241 A1 Aug. 24, 2006

(30) Foreign Application Priority Data

Mar. 18, 2003 (NZ) .................................... 524783

(51) Int. Cl.
*B05B 1/24* (2006.01)
(52) U.S. Cl. ..................... 392/473; 392/465
(58) Field of Classification Search ............ None
See application file for complete search history.

(56) References Cited

U.S. PATENT DOCUMENTS

| 2,287,974 | A | 6/1942 | Cohen |
| 2,976,392 | A | 3/1961 | Wabnitz |
| 3,718,805 | A | 2/1973 | Posey |
| 4,026,025 | A | 5/1977 | Hunt |
| 4,501,952 | A | 2/1985 | Lehrke |
| 5,078,123 | A | 1/1992 | Nagashima et al. |
| 5,265,318 | A * | 11/1993 | Shero .......................... 29/447 |
| 5,385,106 | A * | 1/1995 | Langshaw .................... 111/127 |
| 6,321,037 | B1 * | 11/2001 | Reid et al. ................... 392/473 |
| 6,536,379 | B1 * | 3/2003 | Liu ............................. 122/379 |
| 2003/0136048 | A1 * | 7/2003 | Newson ........................ 47/1.3 |
| 2005/0143259 | A1 * | 6/2005 | Newson .................... 504/116.1 |

* cited by examiner

Primary Examiner—Thor Campbell
(74) Attorney, Agent, or Firm—Young & Thompson

(57) ABSTRACT

A portable fluid heating tool capable of heating a flow of water under mains pressure to about 107 degrees Celsius and has a connection to a water supply via a hose. Water flows through an electrical heater within the tool, then to a thermally controlled pressure regulating valve (80) and then to the outlet nozzle. This valve (80) has a moveable member such as a diaphragm (83) sealing off a pressure chamber (88). Movement of the diaphragm (83) causes a valve (85) to open or at least partly close. When closed the valve (85) impedes, or restricts the flow of water from an inlet (86) to an outlet (87) through the valve. On the other side of the diaphragm a small quantity of water is trapped within the pressure chamber (88), so that as the valve (80) heats up, pressure within the pressure chamber (88) rises as the water turns to water vapor and the air within the chamber also expands. This increase in pressure within the pressure chamber (88) causes the diaphragm (83) to move slightly outwardly causing a pintle (84) to allow the ball valve (85) to open and allow maximum flow of the heated water through the valve (80) to the nozzle of the tool.

17 Claims, 7 Drawing Sheets

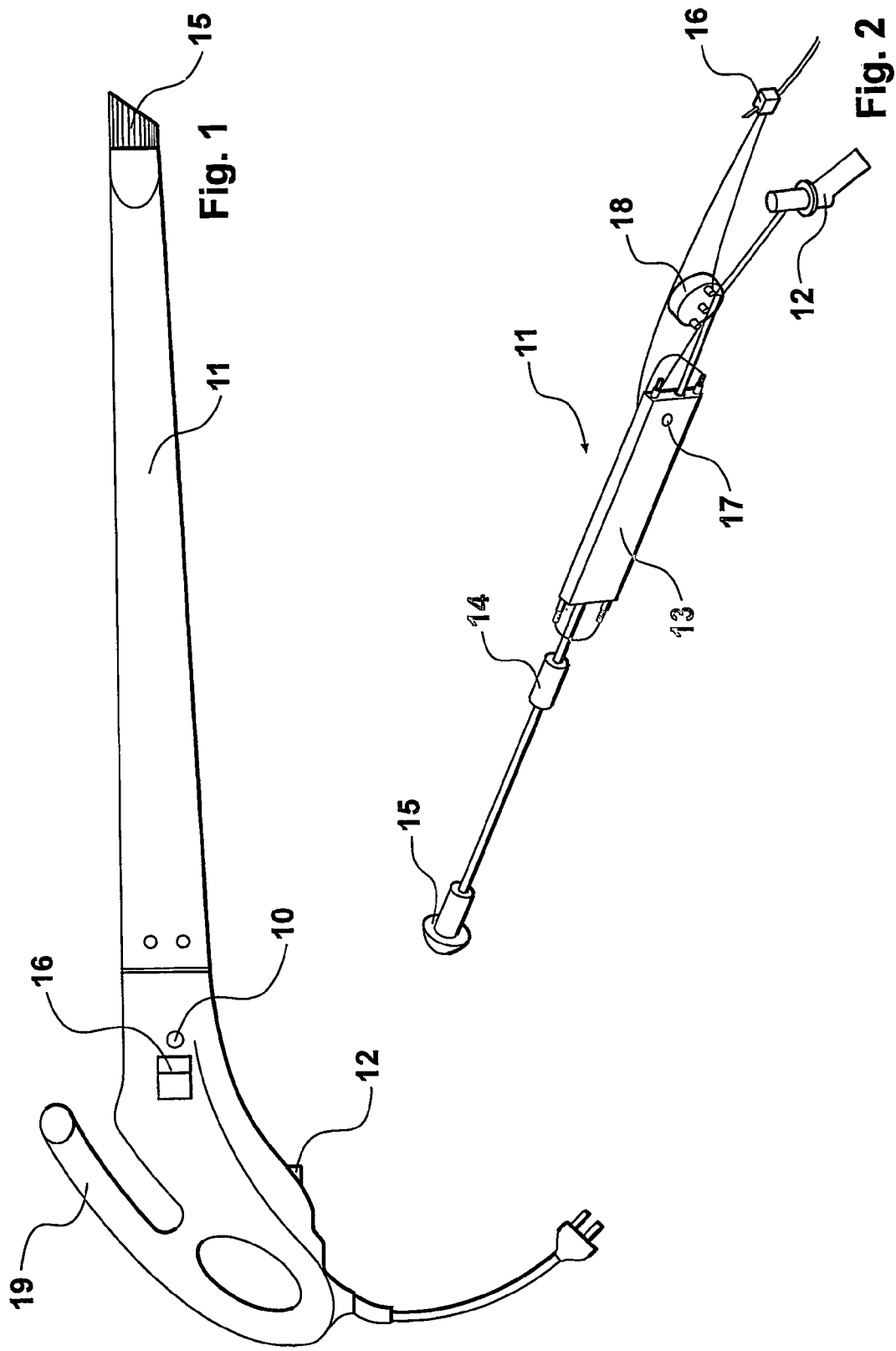

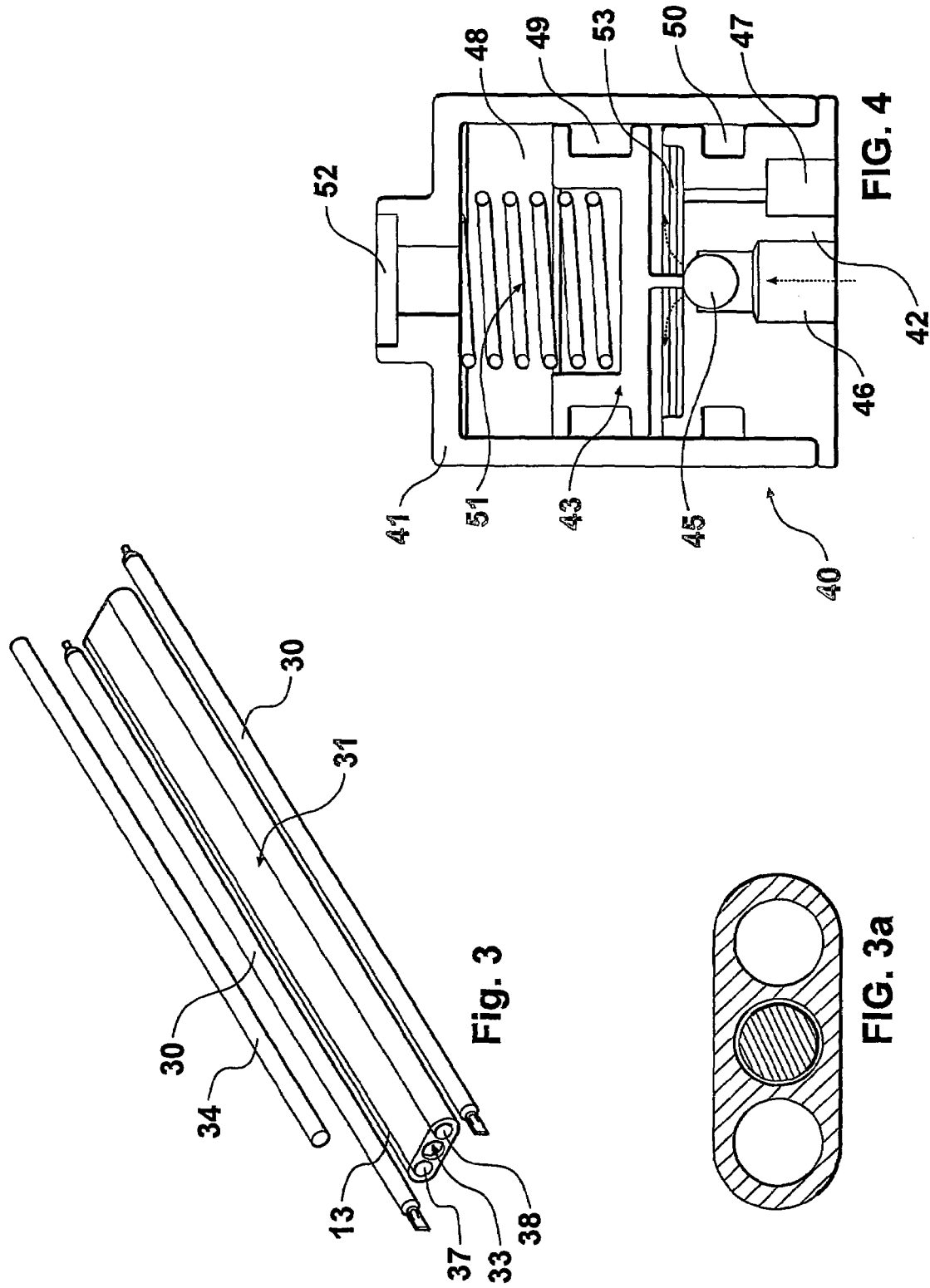

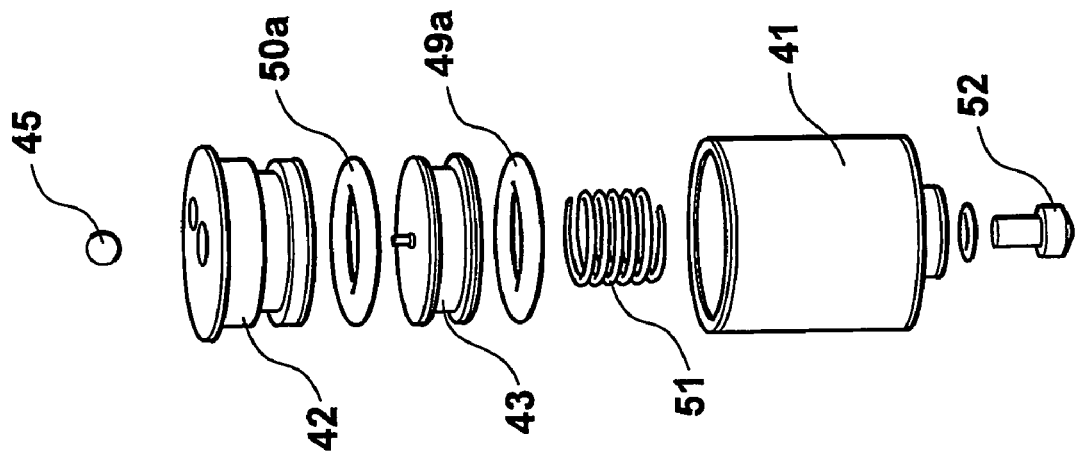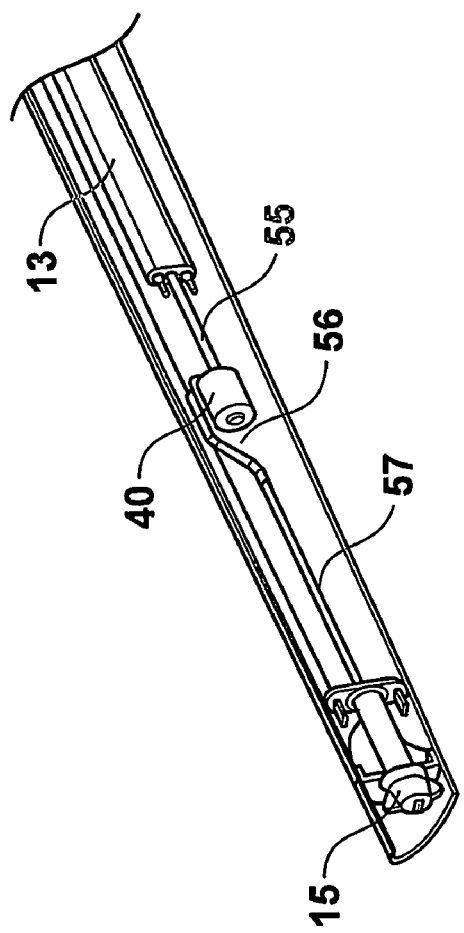

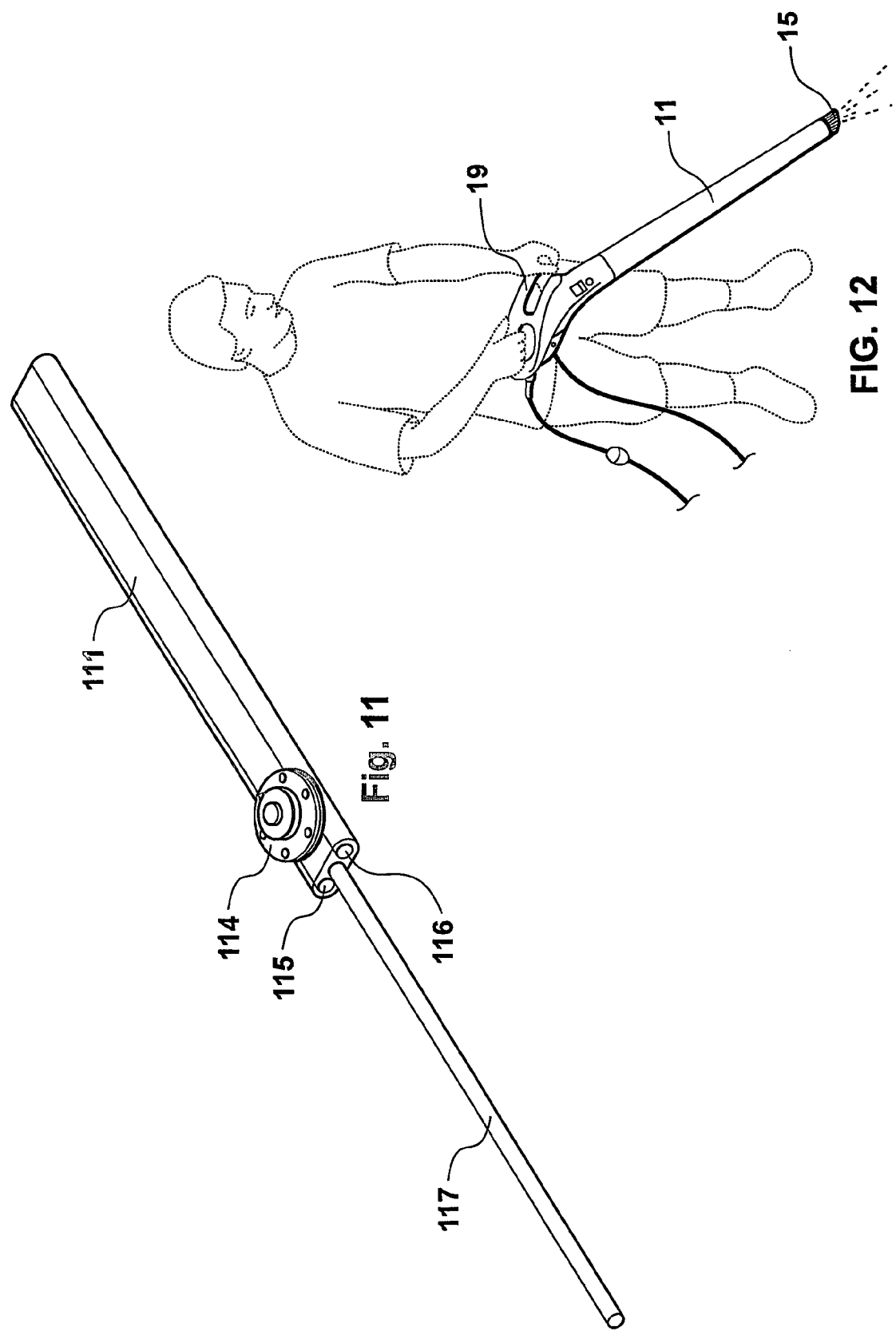

FLUID HEATER

FIELD OF THE INVENTION

This invention relates to a fluid heater and in particular to a portable fluid heater in the form of a hand tool for electrically heating water to a temperature suitable for use in killing vegetation (primarily weeds) or clearing ant's nests. To do this it is preferable that the water is heated in a continuous stream to a temperature at or near its boiling point.

BACKGROUND

A requirement exists for supplying a continuous stream of water at a controlled temperature. One such application is a source of near boiling water in a portable form for use in killing weeds or ant nests, for heating the skin of dead animals so that feathers or hair can be stripped, for wallpaper stripping or for similar purposes. Another application is the provision of water at a substantially constant temperature for washing purposes, e.g. for washing clothes, dishes or hands or in a shower where the temperature should be controlled within plus/minus 1 degree Celsius regardless of flow rate or water pressure.

The apparatus required to do this must avoid some non-obvious problems. Among these is the need for the apparatus not to be orientation sensitive, not to fail disastrously if the supply of water is interrupted, and not to react to air pockets or air bubbles in the water supply or the release of any dissolved gases as the water is heated and to work regardless of the water input temperature.

PRIOR ART

Electrically powered portable continuous supply fluid heaters are known:

U.S. Pat. No. 2,287,974 describes a continuous hand held water heater, however it has no temperature control other than manual flow control and would appear to be sensitive to air bubbles.

U.S. Pat. No. 2,976,392 describes a spray gun which heats the sprayed fluids, however the only temperature control appears to be by manual flow control.

U.S. Pat. No. 3,718,805 describes a portable water heater, however the output is steam and there is no temperature control other than manual flow control.

U.S. Pat. No. 4,026,025 describes a dental syringe with heating of the fluid flow, however the only temperature control is by manual flow control.

U.S. Pat. No. 6,321,037 and its patent family describes a portable water heater in the form of a hand tool or wand, and makes use of an electronic controller to sense the output temperature, and control the supply of power to an electric resistance heater in contact with an internal water conduit. Water flows down the length of the wand, up through a heated pathway, and then down towards the outlet end of the wand.

This patent which is owned by the Applicant, describes a product which has been sold under the trade mark GREEN WEEDER and whilst the product works, it is difficult to control in practice. By using a switched mode power supply, the microprocessor requires the power supply to be interrupted for a number of cycles whilst the element is heating up, thereby creating a lag in the heating process, but more importantly the design of this portable water heater meant that it could fail catastrophically if the water supply from a garden hose was interrupted, by a kink in the hose, or if the end of the wand was raised above horizontal, creating an airlock within the heated pathway inside the wand. This often resulted in a significant "hot spot" in the conduit and overheating of the element leading to element failure. If water flow recommenced the water would be super-heated by this "hot spot" creating a blast of steam, which would often result in the steam pressure blowing off the connecting fittings, and thereby interrupting the supply of water, and if the power was not turned off quickly enough the heating element would burn out.

Many experiments by the inventors of the present invention have shown that a real-time heating element controlled by a microprocessor, and accepting water from a garden hose with varying pressures, flow rates, and endeavouring to maintain the temperature of the output water at or close to boiling point of water is very difficult, if not impossible to achieve with modern day electronics within the cost envelope permitted for the manufacture of a portable garden tool.

Other attempts have been made to control the output water or steam temperature by electronically controlling the electrical input to the heater via a feedback loop linked to sensors monitoring the output temperature and sometimes the input temperature. However it is difficult to cope with air bubbles and varying water pressures and varying input water temperatures in this way, since the range of possible flows is too great. More importantly even the best thermal sensors have a response time measured in seconds so that the reaction time of the feedback loop is limited primarily by the response time of the thermal sensors. By the time the output sensor has responded to a rise in the output temperature of the fluid it is too late as the temperature of the heater has risen by another 20 or 30 degrees Celsius. In most cases providing an average temperature of say 40 degrees Celsius plus/minus 20 degrees Celsius is not acceptable. It is even worse if the output temperature has to be held at or about 100 degrees Celsius as is the case in vegetation control as 80 degrees Celsius is too cool to kill most weeds, and 120 degrees Celsius will result in the generation of too much steam and the likely failure of the device.

None of these heaters are capable of supplying water at a constant temperature if there are changes in the water supply pressure or input flow rate or input temperature.

Object

It is an object of this invention to provide a fluid heater which is capable of providing a heated supply of fluid at a substantially constant temperature, or one which will at least provide the public with a useful choice.

It is a secondary object of this invention to provide a portable hand tool which can supply water consistently near boiling point, and which does not have a strong likelihood of self destructing in imperfect conditions.

STATEMENT OF INVENTION

In a first aspect the invention provides a fluid heater capable of heating a flow of fluid to a desired temperature, said fluid heater having a fluid inlet for connection to a source of fluid, fluid heating means connected to the inlet, and an outlet for delivering heated fluid supplied by the fluid heating means, wherein there is a temperature controlled pressure regulating valve between the inlet and the outlet, the temperature controlled pressure regulating valve having flow restriction means capable of regulating the flow of heated fluid delivered to the outlet, and heat exchange means allowing the temperature controlled pressure regulating valve to be in heat exchange with the fluid heating means or with the heated fluid leaving the fluid heating means, such that heating or cooling of the temperature controlled pressure regulating valve will cause the flow restriction means to open or close to allow an increase or decrease in the flow of heated fluid leaving the outlet, to thereby control the temperature of the heated fluid leaving the outlet.

In a second aspect the invention provides a portable hand tool capable of heating a flow of water to a temperature suitable for killing vegetation, said hand tool having a water inlet for connection to a source of water, water heating means connected to the inlet, an outlet nozzle for delivering heated fluid supplied by the water heating means, wherein there is a temperature controlled pressure regulating valve between the inlet and the outlet nozzle, the temperature controlled pressure regulating valve having flow restriction means capable of regulating the flow of heated fluid delivered to the outlet nozzle, and heat exchange means allowing the temperature controlled pressure regulating valve to be in heat exchange with the water heating means or with the heated fluid leaving the water heating means, such that heating or cooling of the temperature controlled pressure regulating valve will cause the flow restriction means to open or close to allow an increase or decrease in the flow of heated fluid leaving the nozzle, to thereby control the temperature of the heated fluid leaving the nozzle.

In the above paragraph and in the claims we refer to "water" being supplied to the water heating means but then refer to "a heated fluid" leaving the water heating means and travelling to the nozzle. This language is intended to cover various possibilities including: (a) just water leaving the heating means, (b) air, (c) air and water, (d) steam, (e) a mixture of steam and water, (f) a mixture of steam and air, (g) a mixture of steam/water/air and (h) any other fluid or additive injected into the water supply. The more general claim 1 covers the heating of any fluid to any desired temperature.

Where the fluid is heated under pressure to about 100 to 107 degrees Celsius we have found that the dissolved gases are released in the heating means and that the resulting fluid contains a small percentage of air and up to 10% steam. The various percentages will vary depending on the source of water, the amount and type of dissolved gases, any air bubbles in the water supply or trapped in the supply hose, air entrained through leaks in the water supply, hose or fittings, and the temperature and pressure of the heated fluid.

Inventive Step

The inventive step is the realisation that by controlling the flow rate of fluid through the heater it is possible to maintain the output temperature substantially constant (within in most cases plus/minus 1 degree Celsius).

This can be achieved by the use of our "temperature controlled pressure regulating valve".

Preferred Featres or Options

Such a temperature controlled regulating valve preferably has a pressure chamber which acts on a moveable member, the pressure chamber containing a substance (more preferably a liquid and/or a gas) capable of generating a controlled pressure within the pressure chamber to regulate the opening or closing of the valve in response to changes in the temperature of the pressure chamber. Although in some circumstances the substance may be a solid which undergoes a phase change as the temperature rises—examples include flowers of sulphur sublimating to a gaseous state, or more commonly ice within the pressure chamber melting to water and then giving rise to water vapour.

Preferably the pressure chamber contains a mixture of water and air, so that as the contents of the pressure chamber are heated, the pressure within the chamber will rise to exert a force on the flow restriction means to thereby allow fluid flow through the valve to be increased.

Preferably the flow restriction means can vary between a low flow rate of fluid and a high flow rate of fluid, so that flow of heated fluid through the valve provides the heat exchange means to control to the temperature of the pressure chamber.

Preferably the movable member is a diaphragm.

Alternatively the movable member may be a piston.

Preferably the water heating means includes one or more electrical heating elements in or attached to a heat sink.

Preferably a thermal cut-out is mounted on or in the heat sink and is adapted to switch off the electric heating elements if the temperature of the cut-out exceeds a predetermined value.

Preferably the heat sink is a mass of metal of good thermal mass and which surrounds a fluid passage, the fluid passage being sized to prevent the formation of static bubbles even at low flow levels.

Preferably this involves the use of one or more fluid passageways within the heat sink, the or each passageway having a much higher than normal, surface area to volume ratio for the fluid passing through each passageway. This can best be achieved by using a passageway which is circular in cross section and having a filler rod inserted in the passageway so that fluid can flow only in the annulus between the rod and the interior wall of the passageway.

Preferably the heat sink is an extrusion of aluminium.

Preferably the heating elements are retained within apertures in the heat sink.

Preferably the thermal inertia of the heat sink is sufficient that should the fluid flow cease, the over-temperature cut-out will act before the fluid boils and any subsequent temperature rise will be insufficient to cause boiling.

Preferably the heat input from the heater does not cause the water temperature to exceed boiling point at the maximum available flow conditions.

More preferably the invention provides a portable fluid heating tool capable of heating a flow of water to about 100 degrees Celsius, which has a connection to a water supply via a hose to the tool. Water is allowed to flow through an electrical heater within the tool, then to a thermally controlled pressure regulating valve and then to the outlet nozzle. This valve has a moveable member such as a diaphragm sealing off a pressure chamber. Movement of the diaphragm causes a valve to open or at least partly close. When closed the valve impedes, or restricts the flow of water from an inlet to an outlet through the valve. On the other side of the diaphragm a small quantity of water is trapped within the pressure chamber, so that as the valve heats up the pressure within the pressure chamber rises, as the water turns to water vapour, and the air within the chamber also expands. This increase in pressure within the pressure chamber causes the diaphragm to move slightly outwardly causing a pintle to allow the ball valve to open and allow increased flow of the heated water through the valve to the nozzle of the tool.

Preferably the flow controlling valve is rendered temperature sensitive by containing at least some of a first fluid with a boiling point the same as or similar to the fluid being heated, the increase in vapour pressure of the first fluid acting to increase the fluid flow as the temperature approaches boiling point.

Preferably the heat input from the heater does not cause the water temperature to exceed boiling point at the maximum available flow conditions.

Preferably the flow controlling valve first fluid is encapsulated in a bellows or in a sealed cavity with one movable wall.

Preferably the entire fluid path within the heater is of a size such that under all but the most minimal flow conditions static bubbles cannot form.

Preferably under such minimum flow conditions a pressure valve is provided to disconnect the heater.

Conventional resistive heating elements can be inserted within a mass of material, in this case a block of aluminium, which is either cast around the elements or has the elements inserted into channels whilst leaving a channel through the centre of the block. The size and shape of the block of aluminium depends upon the type of the element chosen, and the design characteristics relating to the mass of material suited for a particular application and in particular the wattage of element, but an extruded block is preferred for reasons of dimensional stability.

In the example described below, the heater is rated at 2.4 kW for the heating of water passing through a central conduit, for example the hand held hot water weeder described above, then it is preferable that the block of aluminium is about from 200 to 300 grams in mass, has a central aperture there through, which is tapped at either end to accommodate an inlet tube, of a metal such as copper, and an outlet tube of a metal such as copper. Where an interference fit is judged to provide sufficient stability the inlet and outlet tubes may be merely pressed into the central aperture and provided with an o-ring seal. In some cases the inlet or outlet tubes may be stainless steel or other suitable material.

An inner displacement rod preferably of aluminium occupies most of the area of the central conduit, leaving a coaxial space of about 0.5 mm at the periphery as a fluid passage. Fluid films of around this depth or less have been found to provide laminar flow and sufficient fluid velocity that nucleation sites for any dissolved gases either do not form or that the bubbles formed at such sites (as the dissolved gases start to come out of solution usually when the temperature exceeds 80 degrees Celsius) are swept along with the fluid and decay. Similarly air bubbles in the inlet flow tend to spread across the whole of the flow area and are thus quickly forced from the conduit before they can cause localised overheating. The displacement rod may be hollowed and drilled at each end so that fluid flows through the rod ends and into or out of the coaxial space.

By threading each end of the block of aluminium, with an internal thread, the inlet and outlet tubes can be screwed into the block of aluminium, but a press fit is acceptable.

Our tests shows that a conventional heating element of say two kilowatt capacity, if it is not in contact or immersed in a liquid, will rapidly overheat causing the element to burn out before the thermostat can respond to the rising temperature.

However, by inserting such an element within a heat sink formed from a block of aluminium, which is a particularly preferred material because it has both a high specific heat capacity and a very good thermal conductivity, the rate of rise of the temperature of the element is slowed considerably even if liquid is no longer present.

Depending upon the application, the rate of rise in temperature can be limited to less than one degree per second, so that the heat from the element is absorbed by the mass of aluminium, and because of its good thermal conductivity the effective temperature of the heating element is controlled. As a consequence the life of the element is extended, as any rise in temperature is sufficiently slow that there is time for the thermostat to respond and cut off the power supply in the case of potential overheating of the element. This heat sink of aluminium works well with the temperature controlled pressure regulating valve, and the thermostat functions as a safety "thermal cut out" in the extreme case of overheating of the thermal mass.

By the incorporation of a heat sink it is possible to gain temperature control over conventional electric elements in various applications, but it is also applicable to the design of new types of heating elements.

Conventional resistive heating elements are embedded in the heat sink material, which is preferably of high specific heat capacity and thermal conductivity. In the case shown in FIG. 2 aluminium is preferred, so the aluminium surrounds the elements, and in this case a passage way is left through the centre of the block of aluminium. The elements may be an interference fit in the aluminium and be placed there by heating the aluminium or cooling the elements before fitting.

The mass of the heat sink material required is proportional to the input electrical power and to the rate of change in temperature required by the monitoring method.

Preferably a thermal cut out device is mounted on the heat sink, and helps to eliminate elements from burning out in the event that fluid was no longer present.

DRAWINGS

FIG. 1 illustrates the assembled weed killer and its external house.

FIG. 2 is an internal assembly of the components of a prototype hot water weed killer in a perspective view.

FIG. 3 illustrates the heat sink and displacement rod.

FIG. 3a illustrates an expanded cross-sectional view of the water passageway in the heat sink.

FIG. 4 illustrates the temperature controlled piston valve.

FIG. 5 illustrates the location of piston valve 40 of FIG. 4 between the heater and the nozzle.

FIG. 6 is an exploded view of the valve of FIG. 4.

FIG. 11 is a perspective view of a modified version of the components with the valve mounted directly on the heat sink.

FIG. 12 shows the device in use.

PREFERRED EMBODIMENTS

EXAMPLE 1

Figure 7:
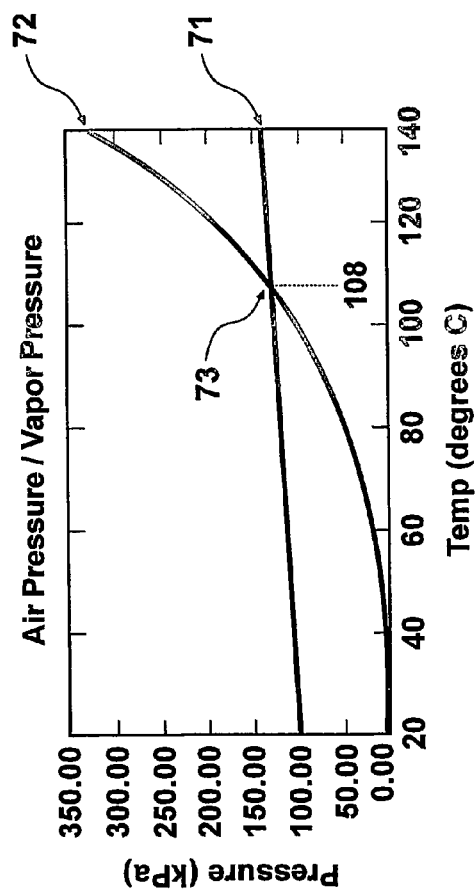
FIG. 7 is a graph of air pressure and water vapour pressure within the pressure chamber.
Figure 7A:
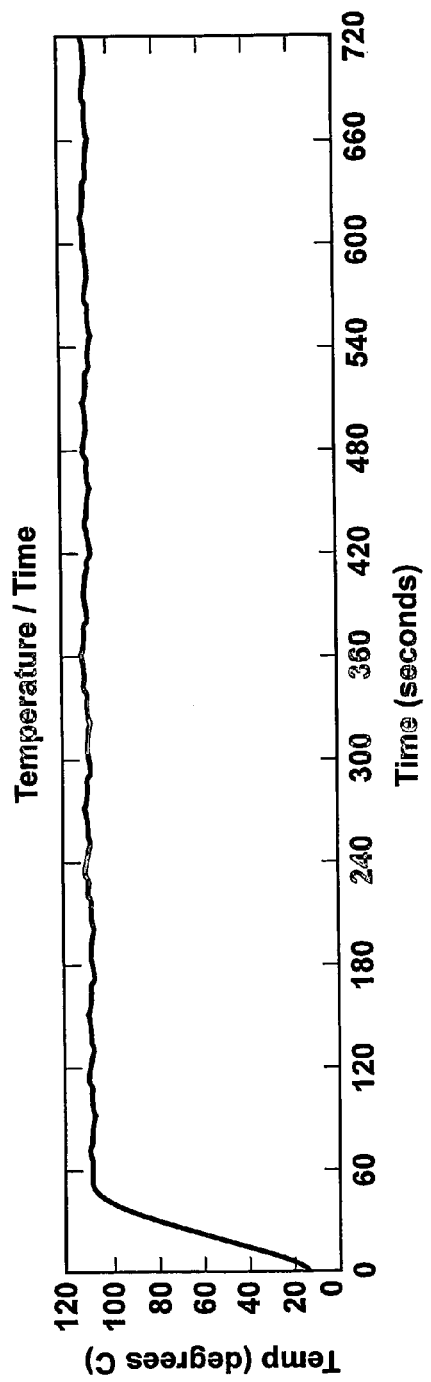
FIG. 7a is a graph of operating temperature over time.

FIG. 1 shows the assembled weed killer in the form of a hand tool comprising a wand 11 of about 1 meter in length, having a substantially oval cross section through its main length of approximately 100 mm along the long axis and 50 mm along the transverse short axis, with a handle at the top of the wand to which a garden hose can be connected at fitting 12, and from which a power cord extends from the base of the handle. Within the hollow body of the wand 11 there is an electrically powered heater which will be described in more detail below. An on-off switch 16 and power indicating light 10 are provided on the handle.

In use the wand 11 is connected to a supply of water via a garden hose, and the power cord is connected to (in this case) an extension lead, to mains supply. In its most preferred form the power supply would be capable of supplying from 2 kW to about 2.4 kW, for example in New Zealand this would be a 240 volt power supply at 10 amps, and in North America it would a 110 volt power supply at a nominal 20 amps.

In its simplest form the water flow through the device would be restricted, but would be uninterrupted, so that when the device was connected to a garden hose water would flow continuously through the device, before the supply of electric power was turned on to heat the water.

The device would be held by the user with the handle 19 above the outlet 15. The use of the device is illustrated in FIG. 12. The user would then turn on the switch 16, allowing the device to heat up, so the water exiting the outlet 15 would quickly reach an operating temperature at or near to boiling point. By providing the outlet with a fine conical spray nozzle the water exiting the outlet 15 would cool off sufficiently over a distance of about 300 nm that the device could be safely carried around the garden without killing the garden vegetation as it is moved over the lawn or plants even though water is continuously flowing through the device. However when the device is placed on a weed, then the boiling water exiting the nozzle 15 will kill both the tops of the vegetation, and sufficient boiling water will enter the ground, and kill the roots and seeds of the plant FIG. 2 shows the internal components of the wand 11, with the hollow plastic casing removed, and with any necessary thermal insulation also removed to show the component parts of the heater:

- 12 is a hose attachment fitting
- 13 is the heater
- 14 is the temperature controlled flow regulating valve
- 15 is the outlet nozzle
- 16 is the power switch
- 17 is a thermal cut-out sensor
- 18 is an optional low pressure switch (used only on the first prototype).

The water flow path from the heater is restricted both by the flow regulating valve 14 and by the small bore of the water pipe itself. The former varies in accordance with the temperature reached while the latter acts to set an upper limit on the amount of flow which can be achieved, thus preventing extreme flows in fault conditions.

The flow regulating valve 14 is the key to the successful operation of this portable water heater. It is a temperature controlled pressure regulating valve, and effectively replaces the microprocessor control used in the earlier attempts at constructing electrically powered portable water heaters.

Various types of temperature controlled regulating valves, developed by the inventors, will be described below. Each of which uses the provision of a small amount of a substance (preferably water or other liquid) within a chamber in the valve, which when heated either by the electrical heater itself or by the fluid heated by the electrical heater, will cause the small volume of water trapped within the valve to turn to water vapour, thereby exerting a gas pressure on a moveable component to open or close a passageway through the valve to thereby vary the flow rate through the valve towards the outlet.

In this example the flow regulating valve is biased so that it can never be completely closed, which ensures that when the heater is connected to a water supply there will always be a flow of fluid through the valve when the water supply is turned on (regardless of whether the heater is on or off).

If the input water is at a temperature of 20 degrees Celsius and the pressure is say 80 psi (the average mains water pressure in New Zealand) then we prefer that the minimum fluid flow rate (i.e. the cold rate) is about 200 mL/minute at about 7 psi (the low pressure setting of the valve). As the fluid flow heats up valve 14 opens further, the rate of increase in opening itself increasing as boiling point of the water in the valve is approached, this allows a maximum flow rate of over 400 mL/minute at about 100 to 107 degrees Celsius and at a pressure of about 80 psi (with the valve fully open the output pressure is at or close to the mains water pressure).

The maximum rated power of the electric heating element for a hot water weeder is chosen so that at the highest water input temperature likely to be reached, with the lowest allowed water pressure, and with the valve at operating temperature the water temperature does not increase significantly above boiling point. Where the input water temperature is at its lowest and the water pressure is at its highest the valve will not be open as far so the water flow will be less and the output temperature will be sensibly the same. In practice, for precise control, the maximum flow rate is chosen based on the available power supply at the portable hand tool (in these circumstances voltage drop across a long lead can be significant unless a high conductivity lead is used).

For single phase power this is likely to be 2 to 2.4 kw at the portable hand tool, in which case a design flow rate of 400–500 ml/minute is a practical flow rate if the input water temperature is say between 14 and 34 degrees Celsius.

We have tested a prototype hand tools with input water temperatures from 5 to 40 degrees Celsius and achieved flow rates of from 355 ml/minute to 530 ml/minute with heating elements rated at 2.4 kW. Tests in freezing conditions show that the hand tool will operate when any ice inside the valve or the heat sink has melted, thought the flow rate for an input temperature of 1 or 2 degrees Celsius is about 300 mls/minute.

Large air bubbles in the water supply may completely occupy the water flow passages within the heater, but since heat transfer to air is better than that to water, and since the viscosity of air is much less than that of water the effect is merely to provide a blast of air at close to 100 degrees Celsius as the air is flushed out of the heater. A small amount of steam may be present in these circumstances but no superheated steam will be generated.

The fluid inlet may be more closely associated with the valve body, for instance by circulating through a jacket, to provide a quicker response.

A means of variably biasing spring 9, for instance by an adjustable internal stop in the valve body, may be provided to allow variation of the initial flow rate, and such an adjustment may be suitable for the control of the output temperature.

The valve is suited for use in a tool providing near boiling water to kill weeds, where the input water is supplied from a long hose at a varying pressure and with a temperature which varies with the season. While the volume of water supplied is not constant the temperature will remain within the desirable range for killing weeds.

The valve is not limited to the use of water and air within the pressure chamber. Other fluids may be used in the pressure chamber, for instance ethyl alcohol and air will provide a lower target temperature for water, while a mixture of solid and gaseous carbon dioxide can provide control of the temperature of a gas at temperatures in the region of −60 degrees Celsius to −80 degrees Celsius.

EXAMPLE 2

Element Heat Sink Assembly

The heater 13 has a heat sink assembly designed to raise the water temperature from an input temperature of approximately 10–20 degrees Celsius to about 100 degrees Celsius, in this instance, for the DIY market in the eradication of weeds and other undesirable plants. In fact, most prototypes of this invention provided an output of pressurised hot water at about 107 degrees Celsius (plus/minus 1 degree Celsius).

This is achieved by inserting standard bar electric resistance heating elements 30 (FIG. 3) into a block of aluminium 31 constituting a heat sink and providing a duct 33 for the water to pass through, in the same block.

Preferably a pair of electric heating elements are provided, so that for a 240 volt power supply the elements can be wired in series, and in the case of 110 volt power supply the elements can be wired in parallel. Alternatively the aluminium block may be longer, with a single heat element, or may be a more complex shape with any number of heating elements inserted into the block. However, we have found it two heating elements is the most effective configuration, enabling the same plant to assemble the units for either 110 volt or 240 volt power supplies, and providing heating elements on either side of the central duct 33.

Any convenient type of electric heating element can be used, but we have found that standard heating elements having a nichrome resistance wire, surrounded by inert filler, and sealed within an outer metal casing, is the simplest type of element to use. However it will be appreciated the elements could in fact be assembled in situ in the aluminium heat sink, rather than being contained within a metal casing as shown in FIG. 3 and then pushed into the voids in the heat sink. We have found that by extruding the heat sink with 3 passageways there is a central duct for the water 33, and two voids 37, 38 for the heating elements. The extrusion can be cut to length to the required thermal mass.

When power is applied to the elements the aluminium heat sink temperature is raised and with water passing through the unit the heat is transferred to the water. By controlling the flow rate of the water and with sufficient surface area in the heat sink the unit can be controlled to deliver the desired temperature before exiting from the assembly. The heat sink assembly is preferably insulated from the outer plastic casing by thermal insulation.

A displacement rod 34 (FIG. 3) is fitted preferably co-axially inside the water duct 33 to create a thin "tube like" flow path for the water through the aluminium heat sink. This design allows the water to have a large surface area in contact with the internal surface duct 33 while providing sufficient water velocity to prevent the build up of any released "dissolved gasses" by flushing them from the system. Either the water duct or the rod have raised longitudinal protrusions to keep the space between the interior wall of the duct and the displacement rod uniform. Optionally the rod or the duct may be rifled to allow a helical flow of water through the duct.

By using the temperature controlled pressure regulating valve 14 it is possible to control the temperature of the output water, so that it is maintained substantially constant at 107 degrees Celsius, at exit nozzle 15 and under pressure. The primary temperature control is achieved by this temperature controlled pressure regulating valve which together with the restrictions imposed on the flow by the nozzle 15, controls the temperature of the output water by controlling the flow rate of the water through the heating element which when power is turned on is provided with an almost constant supply of 2.4 kW of heat from the two heating elements 30 (of FIG. 3). This being balanced between the amounts of heat supplied to the heat sink, the flow rate of water through the heat sink taking the heat away from the heat sink, and the temperature of the water heating up the temperature controlled regulating valve 14.

In use (with the thermal insulation removed from around the heat sink) and water flowing into the heat sink and leaving the valve at about 104 degrees Celsius (slight cooling of the valve takes pace with the thermal insulation removed), the heat sink has a temperature of about 50 degrees Celsius at its upper end (adjacent the influx of cold water) and a temperature of around 130 to 140 degrees close to the output end of the heat sink.

The design temperature of the thermal cut-out depends on its placement along the heat sink. We prefer to use a 70 degree cut-out at or near the inlet end of the heat sink. This has the advantage of switching off the power supply in the event that the inlet end reaches 70 degrees and the outlet end reaches about 150 degrees Celsius.

If the water supply is cut off the entire heat sink tends towards a uniform temperature of about 140 to 150 degrees. When water supply recommences the inlet end is quickly cooled by the incoming water and the temperature gradient along the heat sink is reestablished. As the inlet end cools below the 70 degree Celsius cut-off point, the power is turned on again.

This design and placement of the over temperature cut out sensor 17 allows the heat sink to transfer sufficient heat to the water that it is heated to just above 100 degrees Celsius, without the water turning completely to steam (especially if the flow of water is interrupted and then suddenly recommenced). If the water supply is suddenly restricted, for example by a child turning off the tap to the hose or causing a kink in the hose, the rise in temperature of the aluminium heat sink will cause the thermal cut out 17 to turn off the power supply if the temperature at the upper end of the heat sink 13 reaches the design temperature of 70 degrees Celsius. Such a thermal cut out 17 will minimise the chance of the heat sink overheating and will minimise the chance of any water passing through the heat sink 13 turning to steam and causing problems.

Typically, when the supply of water to the heat sink 13 is resumed for example by un-kinking the hose, there may be a small amount of steam generated, if the heat sink 13 is hotter than the design temperature. But the shape of the small bore passageway 33 with its displacer rod is such that the steam is quickly flushed out of the heat sink to give a short period of "splutter" where both hot water and intermittent steam is expelled from the nozzle, before the weeder quickly reverts to the boiling water at 107 degrees Celsius (pressurised) which is the desired output.

Although we have found that a preponderance of boiling water under a slight pressure, is more useful than pure steam, for this type of weed killer, it is possible to set the thermal cut out temperature, and the operating temperature of the temperature controlled regulating valve to produce steam only, or to produce a larger percentage of steam to hot water than would be produced with the device described above.

One of the advantages of the temperature controlled pressure regulating valve is that it is no longer necessary to modulate the power supply, as the system can be provided with full power on, from start up, the power being only switched off if the water supply is interrupted, and the thermal cut out 17 turns off the supply of power. In addition the pressure switch 18 may be designed to switch off the power supply if a drop in water pressure is detected on the input side of the heat sink.

Although the invention avoids the need for a full microprocessor controlled power modulation system, it is possible to add this feature, although the inventors believe it is unnecessary, for most applications in heating water for weed control.

The inlet and outlet pipes are a push fit in each end of the heat sink and are sealed using o-rings and a star washer to prevent them being forced out by the water pressure.

Technical Data—Prototype Heat Sink Assembly of FIG. 3
Alloy 6063 Temper T5, mill finish
Length 310 mm
Water duct 8.5 mm—internal diameter
Displacement rod 8 mm diameter by 280 mm long
2 X Elements rated at 1200 watts at 110 volts in 8 mm incoloy 800 tube
Heat sink mass 231.22 grams
Displacer mass 14.11 grams
Surface area of water duct 7857.52 square millimeters.

This gives a water surface area to volume ratio of about 1:1 compared to a ratio of about 1:6 for a cylindrical passageway. This thin annular film of water is shown in the expanded cross-sectional view in FIG. 3a.

In the prototype construction shown in FIGS. 2 and 3, the extruded aluminium block 13 operated effectively during testing without being anodised. However it is believed that for production purposes anodising the heat sink, and in particular anodising the interior of the duct 33 will reduce the possibility of corrosion during the working life of the device.

For the United Kingdom, Australian and New Zealand voltages the elements are wired in series, for the United States the elements are wired in parallel.

EXAMPLE 3

Thermal Pressure Regulator

The valve shown in FIG. 3 as flow control valve 14 is preferably a specially designed thermal pressure regulator. A first prototype thermal pressure regulator used a piston, the movement of which is controlled by the temperature response of the vapour pressure of a liquid; in this case the preferred liquid is water, which turns to steam at 100 degrees Celsius, at atmospheric pressure. It will be appreciated that the nature of the liquid can be varied, depending upon the temperature at which the valve is designed to open. This example is concerned with a piston valve, but other types of valves can be designed to use the vapour pressure principle.

The thermal Pressure regulator as fitted to the weed killer is a special low-pressure water regulator 40 using vapour pressure to control the temperature of the outgoing water. It differs from other pressure regulators by having a sealed pressure chamber in which a small amount of water (or other liquid) and air are sealed in place.

The thermal pressure regulator is fitted after the heating element assembly and before the outlet nozzle (see FIG. 2).

This pressure regulator piston valve is designed to be situated at valve 14 of FIG. 2, although this early prototype valve required the valve to be positioned sideways, as the water inlet 46 and water outlet 47 was side by side, rather than straight through as is shown in the case of valve 14 in FIG. 2.

This valve has a top housing 41 and a bottom housing 42, which when sealed together contain the piston 43, and the pressure chamber 48. The piston 43 has a recess on its inner surface to contain coil spring 51. Situated on the underside of the piston 43 (in FIG. 4) is a pintle 44 which pushes against a stainless steel ball 45 situated in the water inlet 46. This ball can be held in place by a small coil spring not shown, or can be effectively held by the inlet water pressure. Underneath the piston 43 is a small chamber 53 provided by a recess in the upper surface of the bottom housing 42, and this chamber 53 communicates both with the inlet port 46 and the outlet port 47.

In addition the bottom housing 42 has provision for narrowing groove 50 for location of an O-ring to seal the housing against water leakage, and the piston 43 also has an o-ring groove 49 for the location of an o-ring to seal the pressure chamber 48 and prevent leakage of water, water vapour or air from inside the sealed pressure chamber 48.

Although not shown, when the valve was assembled a small quantity of water is located within the pressure chamber 48. During assembly water was injected into the chamber 48 by removing plug 52 and using a syringe to squirt say 10 ml of water into a 20 ml chamber. While suitably balancing the amount of water and air, and/or other fluids, the valve can be set to control the pressure and hence flow of water through the valve, dependent upon the temperature of the liquid and/or air within the pressure chamber 48.

By forming the top and bottom housings and piston from heat conductive materials such as metal and metal alloys, the valve can use the temperature of the incoming water through inlet 46 to heat the piston and hence the liquid and air in the pressure chamber to control the movement of the piston, against the stainless steel ball, to thereby increase or decrease the flow of water from inlet 46 past the pintle 44 and back through outlet 47.

Because this valve is designed to use the temperature of incoming water to heat the pintle and the underside of the piston 43, it is desirable that this has a heat exchange feature provided by the flow of fluid through the valve (i.e. the valve is never fully closed). It could be designed as a "leaky valve" with a bypass aperture; though we prefer that the flow restriction means provided by ball valve 45 is always slightly open, so that there is always a small supply of water from inlet 46 past the ball 45 through chamber 53 and back out through outlet 47. Preferably this lower flow rate is as small as possible to enable the passage of water through the heat sink 13 to be as slow as possible to maximise the transfer of heat to the water, whilst there being sufficient water flow through the chamber 53 to effect heating of the pintle and piston 43 to thereby control the temperature of the liquid and/or vapour and/or air within the pressure chamber 48. In practice we set the pressure regulating valve at about 7 psi minimum to provide a low flow rate of about 200 ml/min. The fully open flow rate is about 400 to 500 ml/minute.

Other examples of these vapour pressure valves can make use of heat exchange with the heating elements, and/or heat sink 13 to control the temperature of the liquid/vapour/air within the pressure chamber 48.

In use mains pressure water at say 40 psi to 200 psi is supplied by the main water supply via a hose to the unit. This water then passes through the heater unit to the thermal regulator where the pressure is reduced to below 10 psi (preferably about 7 psi) giving a low flow rate through the nozzle of 250 mls of water more or less per minute. We have found that mains water supply, to a garden hose is typically of the order of 40 psi to 100 psi, and on average would be around 80 psi. Only in extreme cases is it likely that the mains pressure will be above 100 psi. If the water pressure is below 40 psi then water flow through the device will be marginal, particularly if a long length of hose is used. In addition if the water pressure is low, it is sometimes difficult to flush air out of the hose, and the operation of the device is likely to be erratic if large volumes of air pass through the heat sink.

When power is applied to the heater the heated water passes through the unit by way of the thermal regulator to the outlet nozzle. Heat from this water is transferred to the thermal regulator causing the fluid and air in the vapour chamber to expand. This expansion increases the pressure on the regulator piston thus increasing the water pressure on the outlet side of the regulator.

This increased water flow prevents the element assembly from overheating and turning the water into steam giving an effective control over the output water temperature.

The regulator consists mainly of a lower housing 42 a piston 43, spring 51 and outer housing 41. The piston 43 has a small pintle 44 that sits against the ball 45 in the lower housing. When assembled the ball 45 is kept off its seat by the spring 51 behind the piston giving the regulator a low-pressure output. This low-pressure output is necessary in this version to ensure that water can pass through the unit on start up to transfer the heat into the regulator.

The area behind the piston 43 in the outer housing 41 where the spring 51 resides is the vapour pressure chamber 48. When assembled approximately half of this area is filled with a liquid (in this instance water) leaving the remainder as air.

This ratio of liquid to air is not fixed, and the unit can operate successfully with only 10% water or 10% air in the vapour chamber, although we prefer to use about 40% to 55% water (measured as a percentage of chamber volume at 20 degrees Celsius when the valve is assembled).

FIG. 5 shows the location of this temperature controlled piston valve 40 between the heater 13 and the nozzle 15. A copper pipe 55 can be attached to the outlet of duct 33 in the heat sink to inlet 46 of the valve. Because the outlet 47 of the valve is on the same side as the inlet, a copper pipe 56 is bent around the valve to communicate with the straight section 57 which in turn communicates with the outlet nozzle 15. We found that using small bore copper pipe works well in conjunction with the aluminium of the heat sink, and the brass body of the valve 40. These are the materials we used in the prototype (for ease and manufacture) but other materials could be used particularly if the thermal pressure regulator valve is to be in thermal contact with some part of the heater or heat sink.

The air and fluid pressure both increase as the temperature rises and there is a rapid increase in pressure close to the boiling point of the fluid. This steep pressure rise within the chamber gives the effect of increasing the force on the piston in the pressure regulator, thus opening the flow restriction means and increasing the water pressure at the outlet An increase in water pressure at the outlet causes a higher flow rate that partially cools the heat sink and the regulator preventing the water from getting too hot; tests have shown the regulator to be capable of maintaining temperatures within +/−1 degree Celsius.

The fluid used in this application is water; however other fluids could be used for various applications that require a different output temperature range.

FIG. 7 is a graph of pressure against temperature within the pressure chamber. We have measured the pressure exerted by air trapped within the chamber as the temperature of the air rises from 20 degrees Celsius to 130 degrees Celsius. This is shown as line 71 on the graph which rises from 100 kpa at 20 degrees Celsius to 148 kpa at about 130 degrees Celsius. The water vapour pressure on the other hand is shown by line 72, and this rises very slowly between 20 degrees Celsius and 50 degrees Celsius, but then starts to rise more steeply than the change in air pressure, so that by the time the temperature of the pressure chamber exceeds 80 degree Celsius the water vapour pressure is rising rapidly, and from our measurements the water vapour pressure intersects the air vapour pressure at about 108 degrees Celsius marked by point 73 on the graph.

Using water as the fluid in the vapour chamber allows the temperature of the water reaching the outlet nozzle 15, in the range of 98 to 115 degrees Celsius to be maintained (subject to power supply) before exposure to atmospheric pressure. In most cases, we have found that the thermal pressure regulator valve containing water in the pressure chamber will allow the temperature at the outlet nozzle to be 107 degrees Celsius+/−1 degree Celsius.

We have investigated other liquids, and found that by varying the liquid or mixture of liquids depending upon the vapour pressure curves in the pressure/temperature plot of the liquid or combination of liquids enables the output temperature of the water at nozzle 15 to be regulated based on the physical parameters of the liquid and air or other gas mixture present within the pressure chamber.

The advantage of this system of control is that the thermal regulator temperature is fixed by virtue of its design and requires no further input after manufacture.

To obtain a smooth action and prevent the O ring in the piston from sticking the O ring groove has been widened to allow it to roll rather than slide. This also helps in preventing the O ring from sticking after long periods of non-use.

Should there be an airlock or momentary loss of water supply the regulator will open fully (due to a high vapour pressure in the chamber) and purge itself. When water is restored to the unit cooling the vapour chamber will reduce the outlet pressure and restore the unit to its preset temperature.

The prototype thermal regulator housings and piston were constructed of brass, in this prototype, for ease of manufacture and for good thermal transfer properties. We have since found that an aluminium body is more preferable as it has a faster response time than brass. The springs and screw fittings are copper and all O rings are silicon (designed to withstand steam) in order to withstand the heating of the valve by the water leaving the heater on its way to the nozzle 15.

EXAMPLE 4

Second Thermal Pressure Regulator (Diaphragm Valve)

This valve 80 is similar in concept and operation to the valve of FIG. 4 except that the piston of the earlier valve is replaced by diaphragm.

The diaphragm is clamped between the upper housing 81 and the lower housing 82, and provides one wall of the pressure chamber 88. The pressure chamber 88 may have a filter plug 92 (for insertion of water during assembly). This plug can be omitted as water can be inserted into the chamber if it is assembled upside down. In this example the total volume of the chamber is about 10 ml and the volume of the water is about 5 ml.

The diaphragm is preferably a stiff but very slightly flexible metal diaphragm and may have a series of concentric rings, or other ridges in its surface to provide the appropriate degree of stiffness whilst allowing the diaphragm to move minutely to operate the pintle 84. The pintle 84 is preferably attached to the underside of the diaphragm 83 and presses up against ball 85 in the water inlet passageway 86 which communicates with the lower water chamber 93. A plug (not shown) is situated below the ball to keep it in place.

During assembly a small quantity of water is inserted into the pressure chamber before the diaphragm is clamped in place to seal off the pressure chamber. The shape and stiffness of the diaphragm obviates the need for a spring within the pressure chamber, as the diaphragm is biased against the pintle which in turn presses against the stainless steel ball 85 and in that passageway.

In use water would flow from the heater along an appropriate small bore pipe such as a copper pipe to water inlet 86, and when the valve is cold, a small amount of liquid would flow past the ball into chamber 83 and then out through water outlet 87 to another small bore pipe which would in turn take the water to the nozzle 15.

In this arrangement the inlet and outlet apertures are in line with one another so that the plumbing between the heater and the nozzle 15 can be relatively straight forward compared to the arrangement shown in FIG. 5.

In this example the upper and lower housing have been formed from brass, and the diaphragm has been pressed out of copper.

This is also a "leaky valve" being leaky in the sense that even when cold a small amount of water from the hose will pass through the heater and then through the flow restriction means of the valve to the outlet. This is a deliberate design feature of the valve to ensure that the valve body is heated by the water passing through the valve from water inlet 86 through to outlet 87. Movement of the piston is very small and in fact the pintle moves only about 0.01 mm between 20 degrees Celsius and 107 degrees Celsius when the vapour pressure within the piston chamber 88 causes the pintle to press up against the ball to increase the flow rate through the valve.

In our various prototypes we have found that the diaphragm valve works as well as the pressure valve, but has some advantages in ease of assembly, and is believed that a diaphragm valve is more likely to be mass produced for this type of product than would be the case with the piston valve of FIG. 4.

EXAMPLE 5

Third Pressure Regulator (Modified Diaphragm Valve)

Figure 9:
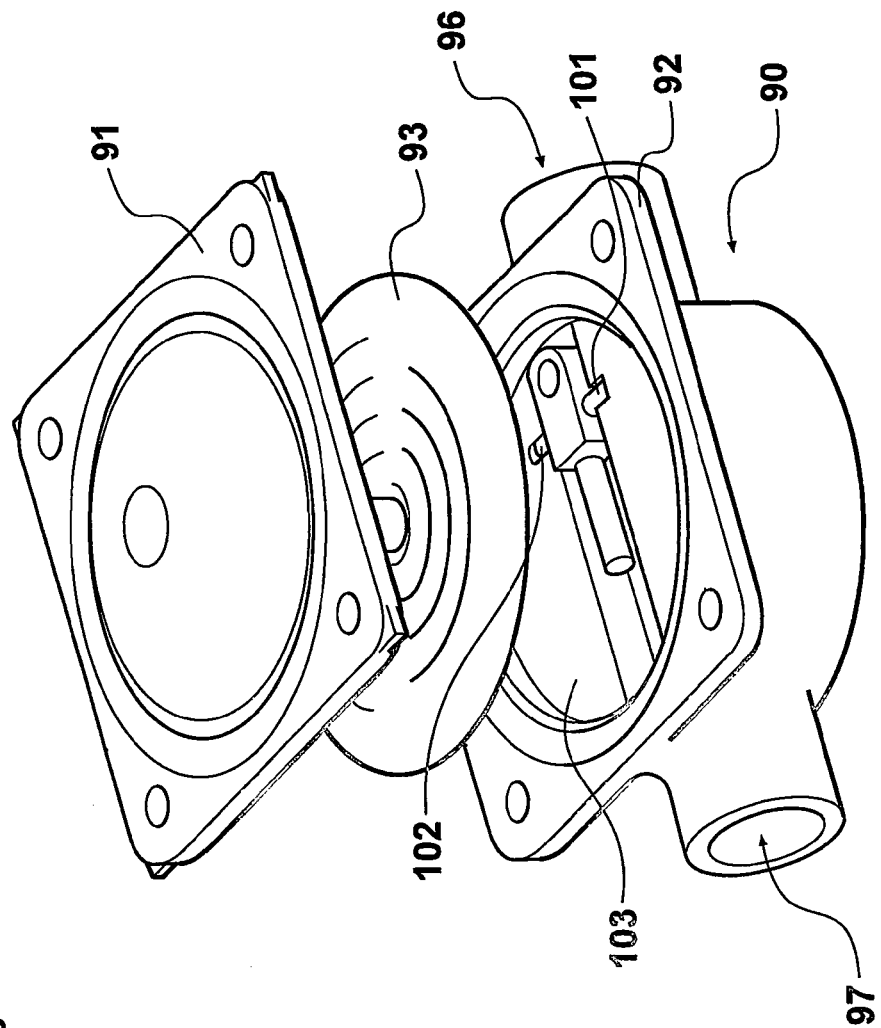
FIG. 9 illustrates a modified diaphragm valve.
Figure 10:
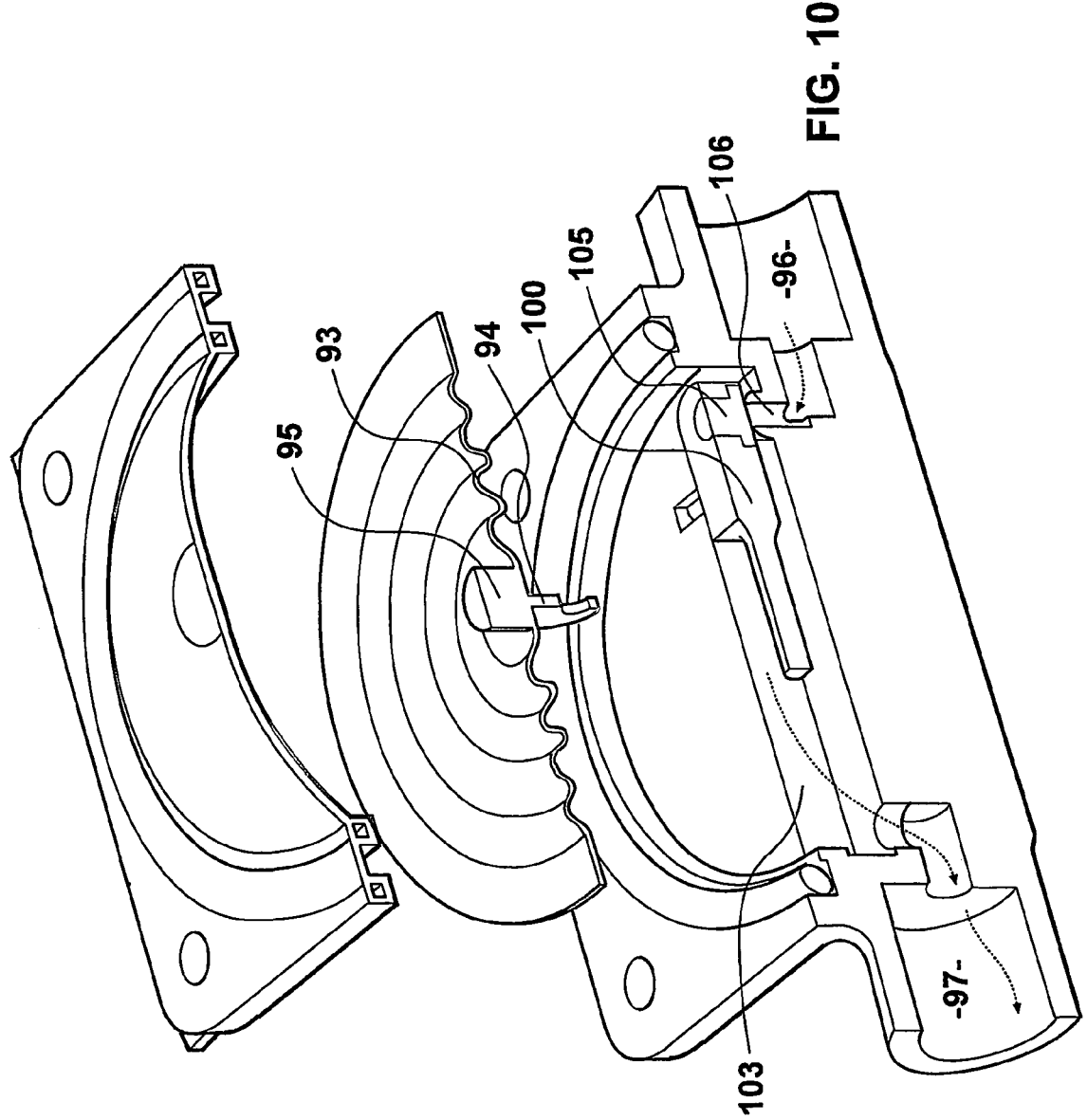
FIG. 10 is a cut away portion of a valve of FIG. 9.

FIG. 9 is an exploded view of a modified diaphragm valve having a pressure chamber. FIG. 10 is a partly cut away and partly shaded view of this valve in order to show the relationship between the diaphragm, and the pintle.

The valve shown in FIGS. 9 and 10 is a modified gas pressure regulator. Modified in the sense that the valve 90 has a sealed pressure chamber containing a small amount of water.

Figure 8:
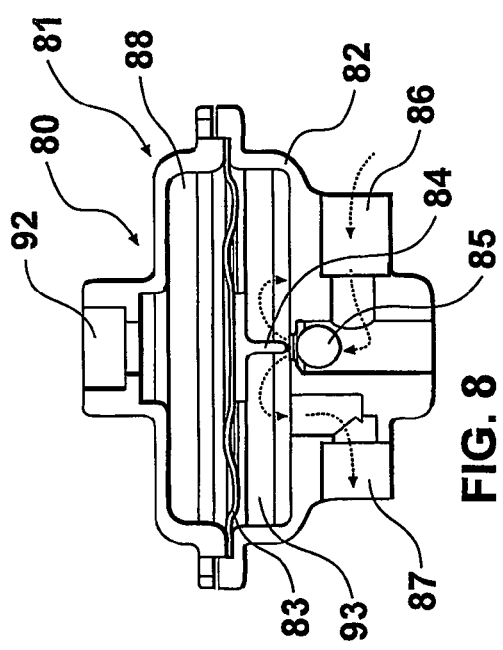
FIG. 8 illustrates a temperature controlled diaphragm valve.

This valve differs from the piston valve of Example 4 or the diaphragm valve of FIG. 8, in that this valve is designed to seal off the water flow through the valve until such time as the temperature of the input water reaches a desired trigger point.

This valve 90 has an upper housing 91 and a lower housing 92. An inlet port 96 is provided in the lower housing, and an outlet port 97 is arranged in the same housing in line with the inlet port. Sandwiched between the upper and lower chambers is a diaphragm 93. A lower chamber 103 sits below the diaphragm, and within that chamber there is a rocker arm 100 in contact with a pintle 94 extending downwardly from the centre of the diaphragm. This pintle 94 is integrally formed with a post 95, and the diaphragm may be made of metal, or a heat resistance rubber or plastics material. A spring (not shown) can be mounted in the pressure chamber between the post 95 and the top of the upper housing 92. Alternatively the pressure applied to the pintle and hence to the rocker arm 100 can be controlled by the appropriate tension in the material of the diaphragm and/or the shape of the diaphragm. In FIG. 10 the diaphragm is shown with a series of concentric circular ridges, to assist in controlling movement of the diaphragm.

The rocker arm 100 is supported on a pair of pivot pins 101, 102 extending on either side thereof (as seen in FIG. 9) and the end of the rocker arm 100 adjacent the inlet 96 has a sealing plug 105, preferably of a resilient material such as neoprene, capable of withstanding the temperature of the input water (which is unlikely to exceed 115 degrees Celsius) so that it seals across a valve seat surrounding the vertical passage 106 which communicates with the inlet port 96.

Unlike the two preceding valves, the pintle 94 in this case is connected to the end of the rocker arm 100, away from the pivot pins 101, 102, so that upward movement of the diaphragm 93 will pull the left hand end of the rocker arm upwardly thereby exerting a downward force on the sealing plug 105 to seal off the passage of water through passageway 106. In practice when the pressure chamber 93 is cold, the diaphragm and its associated pintle 94 will be biased upwardly in FIG. 10, causing the rocker arm and its sealing plug 105 to seal off passageway 106.

As the body of the valve heats up and this heat is transferred to the pressure chamber 93, the vapour pressure within the pressure chamber 93 will increase causing the diaphragm to move downwardly, which causes the pintle to depress that end of the rocker arm 100, and allow the plug 105 to be raised off the valve seat surrounding vertical passageway 106. Water will now flow from inlet 96 through passageway 106 into the lower chamber 103 and out through the outlet port 97.

We have found that by manufacturing the upper and lower housings, and rocker arm of aluminium, the valve body heats up quickly, and it is possible to place this valve in heat exchange communication with the heat sink of the heater 13. It has the advantage that when the valve is cold, there will be minimal flow of water passing through the valve, and for all practical purposes the sealing plug 105 will seal off the passageway 106.

It is only when the valve body heats up that the valve will open. When it heats up sufficiently to allow the vapour pressure to build up within the pressure chamber 93, this increase in the chamber pressure will cause the diaphragm to move very slightly downwardly, which in turn causes the pintle 94 to push on the left-hand end of the rocker arm, 100 thereby allowing the sealing plug 105 to lift off the valve seat and allow water into the lower chamber 103 and hence to the outlet.

EXAMPLE 5

Valve on the Heat Sink

In this version the heat sink 113 is formed of a length of extruded aluminium having 3 apertures through its length. These apertures are each 8 mm in diameter and the central aperture has a filler rod of 7 mm diameter occupying the lower half of its length (by lower half we refer to the output end which has a valve 114 mounted thereon).

Valve 114 has an aluminium body and a stainless steel diaphragm and can be of a similar design to the valve of FIGS. 9 and 10.

The two outer apertures 115, 116 contain electrical heating elements. A copper tube 117 takes the output form the valve 114, whilst the flow of fluid through the central aperture stops short of the end of the heat sink and is diverted through valve 114.

By using an aluminium body for the valve in thermal contact with the heat sink 111, the valve and hence the substance in the pressure chamber heats up or cools down quickly in response to changes in the heat sink. However the valve in this location will run hotter than in the previous examples, and the choice of materials (and the fluid trap within the chamber) need to reflect this higher operating temperature range.

FIG. 7a

This is a graph of normal operating temperatures in degrees Celsius (output temperature of the hand tool of the invention using a valve of the type shown in FIG. 8) over time in seconds. Measurements were made with an input water temperature of 18 degrees Celsius and a heat output of about 2.4 kw. Using a single phase power supply of 240 volts at 10 amps. This shows the tool heated the water to about 105 degrees Celsius within less than 1 minute and maintained that temperature substantially constant over a measure time of more than 10 minutes. Very small temperature fluctuations were noted every 1 or 2 minutes of the order of 1 to 4 degrees Celsius probably due to small pressure changes in the domestic water supply.

FIG. 12

This shows the hand tool 11 in use connected to a power cord and a hose. The user holds the handle 19 and directs the nozzle 15 towards the ground. When water is flowing and any air in the hose has been flushed out he can turn on the power switch 16 (FIG. 1) so that the water is heated to the operating temperature. To kill a weed he places the nozzle on the ground at the . . . . Of the weed for about 5 second so that boiling water kills the roots of the weed and sterilises the ground around the roots.

Advantages of the Preferred Embodiments

The water heater described provides automatic control of water output temperature at a substantially constant temperature, and in the examples shown at the more difficult temperature close to boiling point without undue variation from water input temperature, water pressure or supply voltage. It accomplishes this by varying the output flow in proportion to the output temperature. It does not need a microprocessor controller (though one could be provided as an optional extra). Power is either fully "on:" or fully "off".

Effectively the invention could be regarded as based on a "water cooled heater" in the sense that the temperature of the heat sink is a balance between the heat input from the pair of electric elements, and the heat output, or heat removed by the flow of water through the heat sink. This ignores any loss of heat from the heat sink through the thermal insulation to the casing of the weed killing tool. The control of the temperature of the heat sink been achieved by the opening or closing of the pressure regulating valve, which responds to the temperature of the fluid leaving the heat sink.

It is not susceptible to water supply interruption, or to orientation of the heater.

Variations

A reverse flow prevention valve may be located at the water supply input to prevent the possibility of hot water returning through the input.

Since the output flow is proportional to the input power it is possible to increase the flow by increasing the input power, typically by using more than one electric heater in series or by increasing the surface area of the water film exposed to the heat sink, for example by increasing the circumference of the water film within the heater and using higher wattage heater elements. In practice, water flow would be more easily increased by providing a series of passageways each with filler rods, to provide multiple pathways for the water flowing into the heat sink whilst at the same time maximising the heated surface of the water film and minimising the build-up of bubbles as dissolved gases are released within the passageways.

The flow control valve may close completely once the water supply is disconnected, thus preventing dripping and ensuring that the system is full of liquid. Any water pressure in the input should open the valve at least slightly. This ensures that if fault conditions raise the pressure at the input then the output valve will be open.

Although the water heating device of this invention has been described for use with water supply from a hose connected to a mains water supply, it will be appreciated that the water supply could be a backpack, or a small quantity of water stored in a reservoir attached to or forming part of the portable weed killing device. Such a back pack or reservoir system is less desirable, in this case, as the inlet water pressure is preferably above 40 psi and that would involve use of an additional pump to pump water from the reservoir or backpack to the heater.

In most cases a partly open pressure regulating valve such as the valves described in FIG. 4 and FIG. 8 are practical for use in the garden, as only a small amount of water about 200 ml per minute passes through these valves when cold, increasing rapidly towards about 500 ml of water per minute when the heater heats the water to a temperature at or near boiling point.

A less desired alternative is to make the valve a leaky valve with a small bypass aperture so that some water always flows through the valve. However such a leaky valve is not as reliable as the temperature controlled pressure regulating valves described above as the aperture in a leaky valve may be blocked by particulates in the water supply whereas the temperature controlled pressure regulating valve if partly obstructed will open further until the blockage is swept away.

Note that in these versions, once the garden hose is turned on there will always be some water flowing through the device. Since this is tap water, when cold it cannot harm vegetation and provides a useful watering function in the garden.

However in some cases it may be desirable to include a water supply shutoff valve and the most appropriate valve of this type is an electrically operated solenoid valve, which will enable the user to turn off the supply of electricity to the heater, and at the same time turn off the water flow through the weed killer. Such a solenoid operated valve would preferably be situated between the temperature controlled pressure regulator and the outlet nozzle. It could however be situated closer to the water inlet, i.e. at or adjacent the handle end of the weed killer as shown in FIG. 1. Such a valve could be controlled by the switch shown in FIG. 1 which controls the power to the electric heater.

Although aluminium has been used as the heat sink material, it is possible to use other aluminium based alloys, or magnesium, or other similar materials having both a high specific heat capacity and good thermal conductivity. All parts should be resistant to corrosion and to electro erosion from any dissimilar metals. If aluminium is used it can be anodised to minimise corrosion, especially corrosion from hard or acidic water.

The size shape and mass of material can be varied depending upon the application.

The invention can be used for heating various fluids to particular temperatures and can utilise any convenient source of heat. One domestic application is the heating of water on demand for washing or for showers particularly where the temperature should be controlled to plus/minus 1 degree Celsius despite fluctuations in supply pressure (very common in the home when a tap is turned on when you are in the middle of a shower).

If an adjustable spring is provided within the pressure chamber, then the output temperature could be varied by changing the spring pressure and hence the valve setting.

Finally various other alterations or modifications may be made to the foregoing without departing from the scope of this invention, as set forth in the following claims.

The invention claimed is:

1. A portable fluid heating tool capable of heating a flow of fluid to a desired temperature for killing vegetation, said portable fluid heating tool comprising a fluid inlet for connection to a source of fluid, a fluid heating assembly connected to the inlet, and an outlet for delivering heated fluid supplied by the fluid heating assembly, wherein there is a temperature controlled pressure regulating valve disposed between the inlet and the outlet, the temperature controlled pressure regulating valve having a flow restriction device capable of regulating the flow of heated fluid delivered to the outlet, and wherein the temperature controlled pressure regulating valve is disposed in heat exchange communication with the fluid heating assembly or with the heated fluid leaving the fluid heating assembly, such that heating or cooling of the temperature controlled pressure regulating valve will cause the flow restriction device to open or close to allow an increase or decrease in the flow of heated fluid leaving the outlet, to thereby control the temperature of the heated fluid leaving the outlet.

2. A portable hand tool capable of heating a flow of water to a temperature suitable for killing vegetation, said hand tool having a water inlet for connection to a source of water, water heating means connected to the inlet, an outlet nozzle for delivering heated fluid supplied by the water heating means, wherein there is a temperature controlled pressure regulating valve between the inlet and the outlet nozzle, the temperature controlled pressure regulating valve having flow restriction means capable of regulating the flow of heated fluid delivered to the outlet nozzle, and heat exchange means allowing the temperature controlled pressure regulating valve to be in heat exchange with the water heating means or with the heated fluid leaving the water heating means, such that heating or cooling of the temperature controlled pressure regulating valve will cause the flow restriction means to open or close to allow an increase or decrease in the flow of heated fluid leaving the nozzle, to thereby control the temperature of the heated fluid leaving the nozzle.

3. A portable hand tool as claimed in claim 2, wherein the temperature controlled pressure regulating valve is situated between the water heating means and the nozzle.

4. A portable hand tool as claimed in claim 2, wherein the temperature controlled pressure regulating valve has a pressure chamber which acts on a moveable member, the pressure chamber containing a temperature responsive substance capable of generating a pressure within the pressure chamber to move the moveable member to regulate the opening or closing of the flow restriction means in response to changes in the temperature of the substance in the pressure chamber.

5. A portable hand tool as claimed in claim 4, wherein the substance is a liquid, a gas, or a mixture of a liquid and a gas.

6. A portable hand tool as claimed in claim 4, wherein the substance is a mixture of water and air.

7. A portable hand tool as claimed in claim 5, wherein the movable member is a diaphragm.

8. A portable hand tool as claimed in claim 6, wherein the water heating means includes one or more electrical heating elements in or attached to a heat sink.

9. A portable hand tool as claimed in claim 8, wherein a thermal cut-out is mounted on or in the heat sink and is adapted to switch off the electric heating elements if the temperature of the cut-out exceeds a predetermined value.

10. A portable hand tool as claimed in claim 9, wherein the heat sink is an extrusion of aluminum and contains apertures or passageways for the heating elements and one or more fluid passageways having a large surface area to volume ratio.

11. A portable hand tool as claimed in claim 10, wherein the large surface area to volume ratio exceeds a ratio of about 1:1.

12. A portable tool capable of heating a flow of water to a desired temperature for killing vegetation comprising:
    (a) a fluid inlet for connection to a source of water;
    (b) a fluid heating assembly connected to the inlet for heating a fluid entering the fluid inlet;
    (c) an outlet coupled in fluid communication with the fluid heating assembly for delivering heated fluid supplied by the fluid heating assembly to vegetation to kill the vegetation;
    (d) a temperature controlled pressure regulating valve disposed between the inlet and the outlet; and
    (e) a flow restriction device capable of regulating the flow of heated fluid delivered to the outlet, wherein the flow restriction device is interfaced with the temperature controlled pressure regulating valve such that heating or cooling of the temperature controlled pressure regulating valve results in the flow restriction device correspondingly opening or closing to allow an increase or a decrease in the flow of heated fluid leaving the outlet to thereby control the temperature of the heated fluid leaving the outlet.

13. The portable tool of claim 12, wherein the temperature controlled pressure regulating valve has a pressure chamber which acts on a moveable member, the pressure chamber containing a temperature responsive substance capable of generating a pressure within the pressure chamber to move the moveable member to regulate the opening or closing of the flow restriction device in response to changes in the temperature of the substance in the pressure chamber.

14. The portable tool of claim 12, wherein the water heating assembly includes one or more electrical heating elements in or attached to a heat sink.

15. The portable tool of claim 12, wherein the flow restriction device is interfaced with the temperature controlled pressure regulating valve such that heating or cooling of the temperature controlled pressure regulating valve results in the flow restriction device correspondingly opening or closing to allow the increase or the decrease in the flow of heated fluid leaving the outlet to thereby control the temperature of the heated fluid leaving the outlet to be at or greater than about 100 degrees Celsius.

16. The portable tool of claim 12, wherein the flow restriction device is interfaced with the temperature controlled pressure regulating valve such that heating or cooling of the temperature controlled pressure regulating valve results in the flow restriction device correspondingly opening or closing to allow the increase or the decrease in the flow of heated fluid leaving the outlet to thereby control the temperature of the heated fluid leaving the outlet to be between about 100 degrees Celsius and about 115 degrees Celsius.

17. The portable tool of claim 12, further comprising a body in form of a wand having a handle graspable by a user for suspending the body above a ground surface, wherein the fluid inlet, fluid heating assembly, the outlet, the temperature controlled pressure regulating valve, and the flow restriction device are all coupled to the body.

* * * * *